US 6,749,402 B2

(12) United States Patent
Hogan et al.

(10) Patent No.: US 6,749,402 B2
(45) Date of Patent: Jun. 15, 2004

(54) NUTATING PUMP, CONTROL SYSTEM AND METHOD OF CONTROL THEREOF

(75) Inventors: Tim Hogan, Rock Island, IL (US); Thomas J. Amsler, Grayslake, IL (US); James R. Cleveland, Carpentersville, IL (US)

(73) Assignee: Fluid Management, Inc., Wheeling, IL (US)

( * ) Notice: Subject to any disclaimer, the term of this patent is extended or adjusted under 35 U.S.C. 154(b) by 0 days.

(21) Appl. No.: 10/207,928

(22) Filed: Jul. 30, 2002

(65) Prior Publication Data

US 2002/0197164 A1 Dec. 26, 2002

Related U.S. Application Data

(60) Continuation-in-part of application No. 09/920,976, filed on Aug. 2, 2001, now Pat. No. 6,540,486, which is a division of application No. 09/665,695, filed on Sep. 20, 2000, now Pat. No. 6,398,513.

(51) Int. Cl.[7] ................. F04B 1/26; F04B 7/04

(52) U.S. Cl. ............... 417/53; 417/490; 222/333
(58) Field of Search ............ 417/53, 490, 500, 417/326; 141/168; 222/333

(56) References Cited

U.S. PATENT DOCUMENTS

| | | | | |
|---|---|---|---|---|
| 5,312,233 A | * | 5/1994 | Tanny et al. | 417/316 |
| 5,460,091 A | * | 10/1995 | Mazzenga et al. | 101/366 |
| 6,336,405 B1 | * | 1/2002 | Kawata et al. | 101/480 |

* cited by examiner

*Primary Examiner*—Charles G. Freay
(74) *Attorney, Agent, or Firm*—Marshall, Gerstein & Borun LLP

(57) ABSTRACT

A fluid dispense system having a computer control system that operatively controls a stepper motor driving a pump. The stepper motor actuates the pump piston through partial revolutions. The computer control system determines the number of stepper motor steps required to pump a desired amount of fluid by the pump by rotating the piston through segments which are less than a full revolution. Further, the controller varies the speed of the stepper motor to avoid splashing of the dispense fluid and motor stalling.

29 Claims, 8 Drawing Sheets

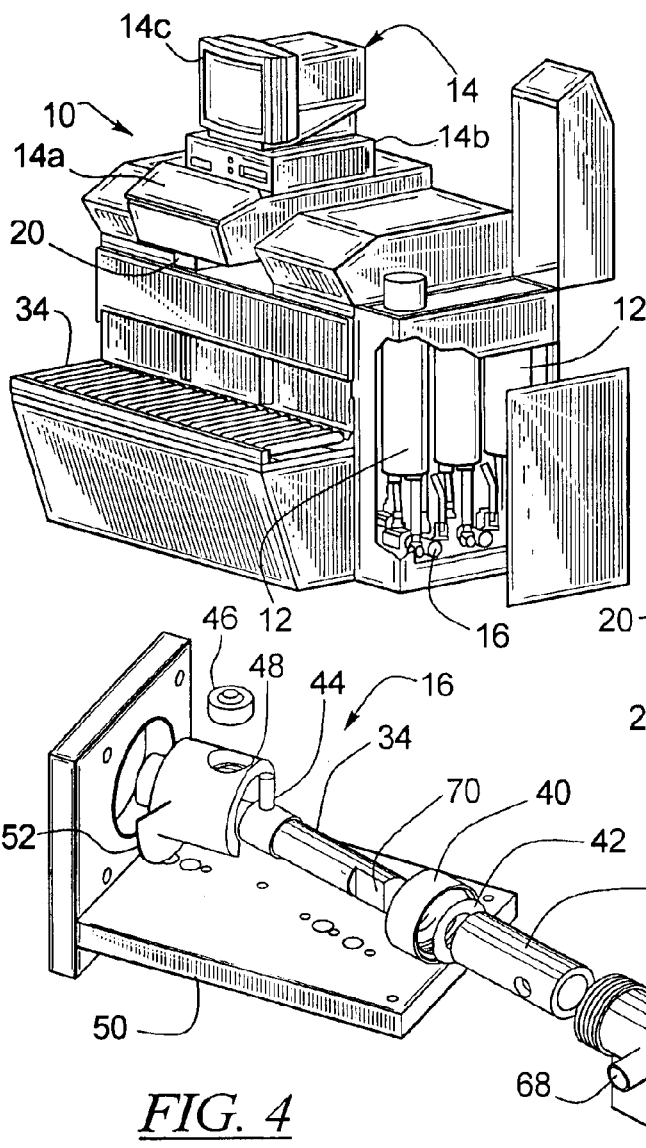
FIG. 2
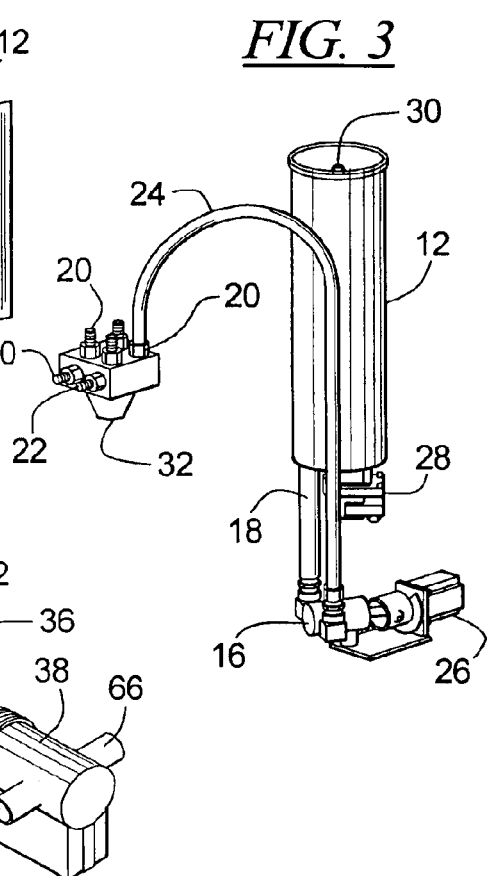
FIG. 3
FIG. 4
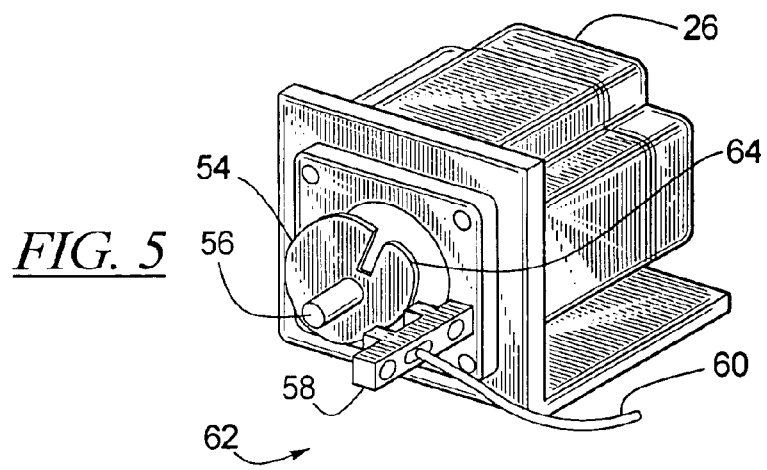
FIG. 5

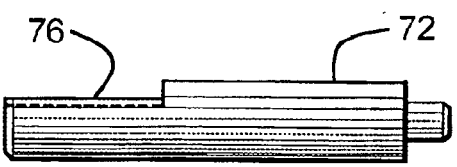
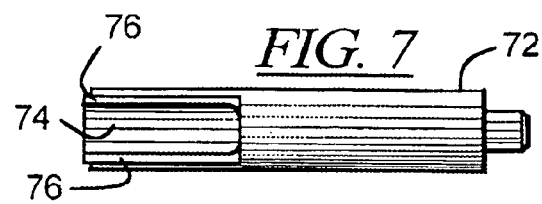
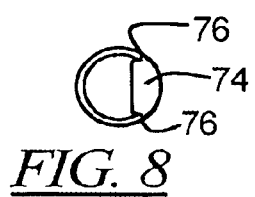
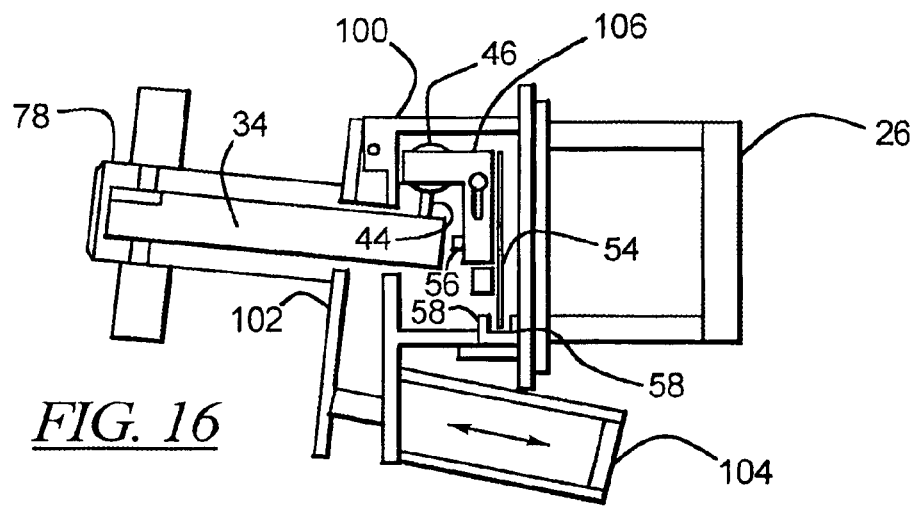
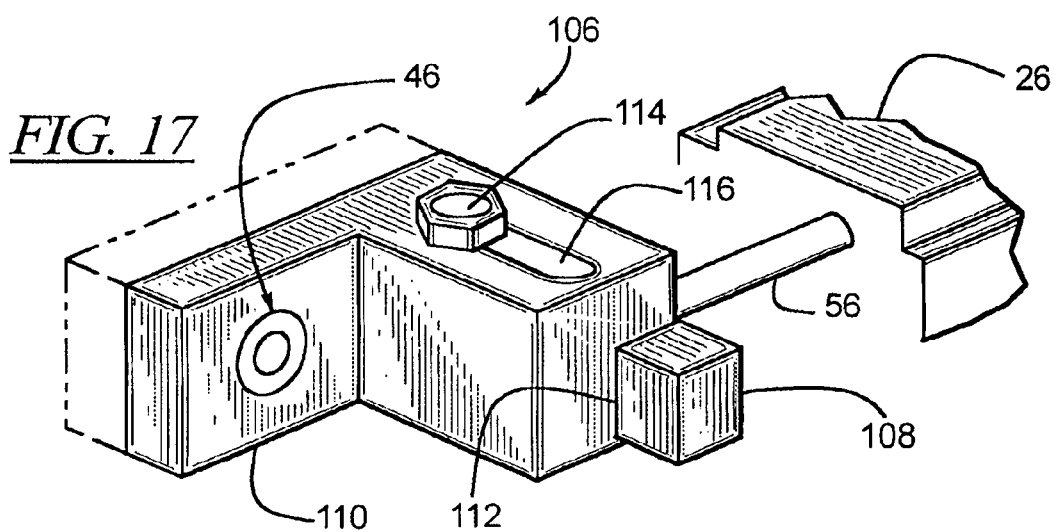

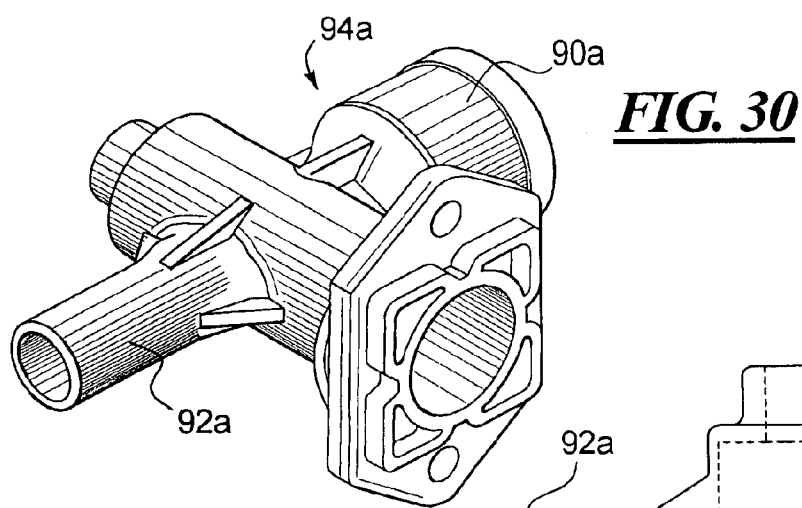
FIG. 30
FIG. 31
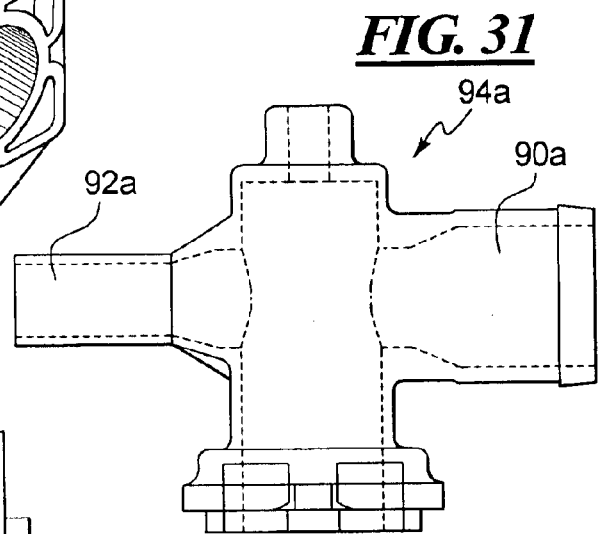
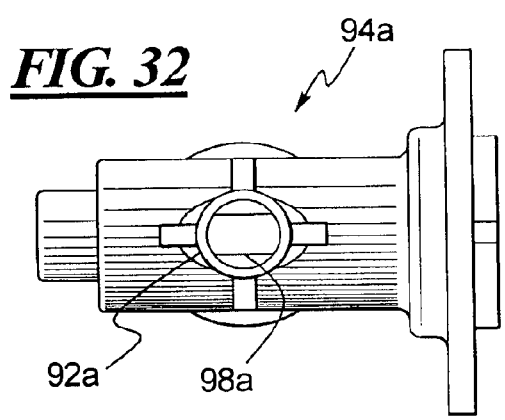
FIG. 32
FIG. 33
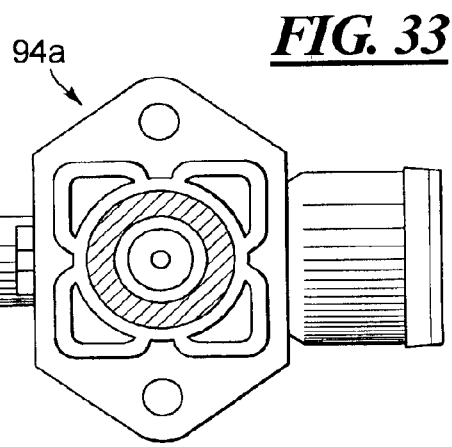
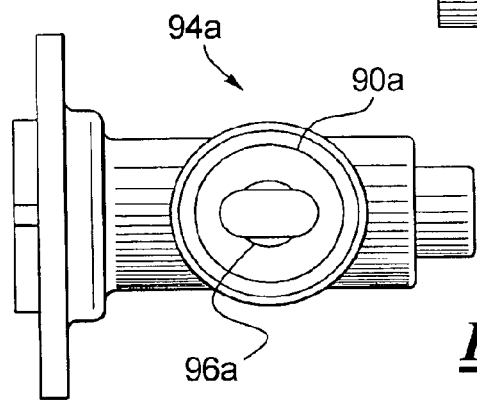
FIG. 34

NUTATING PUMP, CONTROL SYSTEM AND METHOD OF CONTROL THEREOF

This application is a continuation-in-part of U.S. patent application Ser. No. 09/920,976 filed on Aug. 2, 2001, now U.S. Pat. No. 6,540,486 (issued Apr. 1, 2003) which is a divisional application of U.S. patent application Ser. No. 09/665,695 filed on Sep. 20, 2000, now U.S. Pat. No. 6,398,513, issued on Jun. 4, 2002.

BACKGROUND

1. Technical Field

An improved nutating pump is disclosed as well as control systems for nutating pumps and methods of controlling dispense rates of nutating pumps so as to prevent, on one hand, splashing, and, on the other hand, motor stalling. The nutating pumps, control systems and methods disclosed herein are applicable to the field of paint colorant dispensers but have numerous other applications as well.

2. Description of the Related Art

Paints are made in a vast number of different colors and shades of colors. Each specific paint color has a specific formula of components to provide the desired color. A paint formula generally includes a relatively large amount of a base and smaller amounts of one or more colorants. Each colorant is measured according to the formula and dispensed from a bulk colorant supply, added to the base, and then mixed to produce the desired paint color.

Existing colorant dispensers have been used in retail paint supply stores and hardware stores, for example. Existing colorant dispensing equipment has included manual and automated machines. Automated colorant dispensing equipment can include several bulk colorant containers, in which each colorant container is connected to an inlet of a fluid pump. The outlet of each fluid pump is typically connected to a three-way valve which has a dispense outlet connected to a dispense nozzle and a by-pass outlet connected to a recirculation fluid line. Either one motor may drive all pumps or several pumps may be driven by a single motor through a common drive mechanism or each pump may be driven by an individual motor.

In single motor systems, when an amount of colorant is dispensed, the motor drives the pumps and the three-way valve for the particular colorant is opened to allow the colorant to be dispensed through the nozzle. The time period that the valve remains open determines the amount of colorant dispensed. Also, the colorant recirculates back into its container rather than being undesirably dispensed. The other three-way valves, which may be simultaneously driven by the motor, are in a by-pass mode.

However, existing colorant dispensing equipment can be improved. Existing colorant dispensing equipment utilizes a three-way valve for each colorant container, which increases the equipment costs and manufacturing costs. Also, the plurality of three-way valves tend to be a significant source of maintenance and service problems. Furthermore, the accuracy of the amount of colorant dispensed using the existing pump and valve arrangements can be improved. Also, a by-pass colorant flow path is needed because of the prominence of using a single motor to simultaneously operate all of the pumps. It is desired to more accurately control the amount of colorant dispensed so that the resulting paint color for any particular formula is more consistent. Greater accuracy and control over the colorant dispensing process provides greater consistency in paint color for any given formula.

One paint colorant dispenser disclosed in copending application Ser. No. 09/665,695 utilizes a nutating pump and a computer control system to control the pump. Nutating pumps have a piston which is positioned inside of a housing having a fluid inlet and a fluid outlet. The piston simultaneously slides axially and rotates inside of the housing. Prior to the system disclosed in application Ser. No. 09/665,695, existing nutating pumps have been operated by rotating the piston through a full 360° rotation and corresponding axial travel of the piston. Such piston operation results in a specific amount of fluid pumped by the nutating pump with each revolution. Accordingly, the amount of fluid pumped for any given nutating pump is limited to multiples of the specific volume. If a smaller volume of fluid is desired, then a smaller sized nutating pump is used or manual calibration adjustment are made to the pump.

For example, in the art of mixing paint, paint colorants can be dispensed in amounts as little as $\frac{1}{256}$th of a fluid ounce. As a result, existing nutating pumps for paint colorants can be very small. With such small dispense amount capabilities, the motor of such a small pump would have had to run at excessive speeds to dispense larger volumes of colorant (multiple full revolutions) in an appropriate time period.

In contrast with larger pumps, in order to minimize the dispense motor speed, a partial revolution dispense for such a larger capacity nutating pump would be advantageous. However, using a partial revolution to accurately dispense fluid is difficult due to the non-linear output of the nutating pump dispense profile vs. angle of rotation.

Specifically, typical nutating pumps have a sinusoidal dispense rate or flow rate profile. Referring to FIG. 1, this sinusoidal profile is graphically illustrated. The line 1 graphically illustrates the flow rate at varying points during one revolution of the piston. The portion of the curve 1 above the horizontal line 2 representing a zero flow rate represents the output while the portion of the curve 1 disposed below the line 2 represents the intake. Both the pump output and pump intake flow rates reach both maximum and minimum levels and therefore there is no linear correlation between piston rotation and either pump output or pump intake. The disclosure of application Ser. No. 09/665,695 addresses this problem by dividing a single revolution of the pump piston into a plurality of steps that can range from several steps to four hundred steps or more. Controllers and algorithms are used with a sensor to monitor the angular position of the piston, and using this position, calculate the number of steps required to achieve the desired output. Various other improvements and methods of operation are disclosed in the application Ser. No. 09/665,695.

The sinusoidal profile illustrated in FIG. 1 is based upon a pump operating at a constant motor speed. While operating the pump at a constant motor speed has its benefits in terms of simplicity of controller design and pump operation, the use of a constant motor speed also has inherent disadvantages which are illustrated in FIG. 1. Specifically, in certain applications, the maximum output flow rate illustrated on the left side of FIG. 1 can be disadvantageous because the output fluid may splash or splatter as it is being pumped into the output receptacle at the higher flow rates. For example, in paint mixing applications, any splashing of the colorant as it is being pumped into the output pail results in an inaccurate amount of colorant being deposited in the pail but also colorant being splashed on the colorant machine which requires labor intensive clean-up and maintenance. Obviously, this splashing problem will adversely affect any nutating pump application where precise amounts of output fluid are being delivered to an output receptacle that is either full or partially full of liquid or small output receiving receptacles. Paint colorant systems are but one example where splashing will be problematic.

Further, in addition to the splashing problem discussed above, the large pressure drop that occurs within the pump as the piston rotates from the point where the dispense rate is a maximum to the point where the intake rate is a maximum (i.e. the peak of the curve shown at the left of FIG. 1 to the valley of the curve shown towards the right of FIG. 1) can result in motor stalling for those systems where the motor is operated at a constant speed. As a result, motor stalling will result in an inconsistent or non-constant motor speed, there by affecting the sinusoidal dispense rate profile illustrated in FIG. 1, and consequently, would affect any control system or control method based upon a preprogrammed sinusoidal dispense profile. The stalling problem will occur on the intake side of FIG. 1 as well as the pump goes from the maximum intake flow rate to the maximum dispense flow rate.

Accordingly, there is a need for approved nutating pump with approved control system and/or a method of control thereof where by the pump motor is controlled so as to reduce the likelihood of splashing during the dispense portion of the piston revolution and which can eliminate the possibility of any motor stalling as the piston rotates from a dispense position to an input position and vice versa.

SUMMARY OF THE DISCLOSURE

Improved nutating pumps, control systems and methods of controlling such pumps are disclosed which accurately, consistently, and effectively dispense fluid. While the disclosed pumps and control systems are described in connection with paint colorant dispensers, the disclosed pumps and control systems can be utilized to dispense any desired fluid. For example, the disclosed pumps and control systems and methods can be used in fluid dispensers for pharmaceuticals, cosmetics, inks, and other fluids at controlled volumes.

A disclosed paint colorant dispenser has a computer control system which operates a stepper motor or other incrementally controlled drive that drives a valveless pump, such as a nutating pump. Paint color formulas are stored in the computer control system and selected by an operator to mix a desired color of paint. The nutating pump pumps colorant from a bulk container to a dispense nozzle based on signals sent by the computer control system according to the paint color formula. The computer control system operates the stepper motor and the nutating pump such that the pump piston rotates less than a full 360° revolution for each step of the stepper motor. For example, 400 steps may be required for one fill 360° revolution. The stepper motor and the nutating pump are rotated through a desired number of steps to dispense a desired amount of fluid.

In addition to breaking down a piston rotation into a plurality of steps, the control system also acts to reduce the motor speed during those steps of the profile where the dispense rate is highest (i.e. the peak of the sinusoidal dispense profile) which reduces the possibility of splashing and therefore an inaccurate dispense of fluid. In an embodiment, the control system may also increase the motor speed during the intake portion of the profile. The speed can be increased during the intake in a variety of ways. One embodiment would involve increasing the motor speed during the beginning and end portions of the intake to increase the intake flow rate at the beginning and end portions of the intake without increasing the peak intake flow rate.

Another embodiment involves a uniform increase of motor speed during the intake portion of the cycle which would, of course, increase the peak intake flow rate. An advantage of increasing motor speed during the intake portion of the profile would be to make up for lost time which results from reducing the peak dispense rate during the dispense portion of the profile. Of course, other embodiments would include reducing motor speed and peak dispense rate during the dispense portion of the profile without modifying the intake portion of the profile.

The nutating pump of the present invention can be adjustable. For example, the angle between the axis of the nutating pump piston and the axis of the stepper motor shaft can be adjusted by an actuator. The computer control system sends signals to the actuator to operate the actuator which positions the nutating pump piston at a desired angle. The automated nutating pump angle adjustment effectively adjusts the pump fluid output through computer control.

Another nutating pump adjustment also provides for changing the pump fluid output. In this adjustment, the distance that a spherical bearing is off-set from the stepper motor shaft can be varied. For example, the bearing off-set adjustment alters the fluid output of the nutating pump, and can be used to calibrate the pump.

Various advantages of the disclosed pumps, control systems and control methods will become apparent upon reading this disclosure including the appended claims with reference to the accompanying drawings. Certain advantages may be desired, but not necessarily required to practice the principles embodied in this disclosure.

It will also be noted that the control methods disclosed herein apply to pumps other than nutating pumps.

BRIEF DESCRIPTION OF THE DRAWINGS

FIG. 2 is a perspective, partial cut-away view of a disclosed fluid dispense system.

FIG. 3 is an enlarged perspective view of a portion of the fluid dispense system of FIG. 1.

FIG. 4 is a perspective, exploded view of a nutating pump of FIG. 3;

FIG. 5 is a perspective view of a position sensor;

FIG. 6 is a front elevational view of the piston of the nutating pump of FIG. 4;

FIG. 7 is a top plan view of the piston of FIG. 6;

FIG. 8 is a left end view of the piston of FIG. 7;

FIG. 9 is a right end view of the piston of FIG. 7;

FIG. 16 is an elevational view of a disclosed adjustable nutating pump;

FIG. 17 is an enlarged, partial perspective view of a piston driver of FIG. 16;

FIG. 30 is a perspective view of an alternative embodiment of a pump housing;

FIG. 31 is a top elevational view of the housing shown in FIG. 30;

FIG. 32 is a left side elevational view of the pump housing shown in FIG. 30;

FIG. 33 is a front elevational view of the pump housing shown in FIG. 30; and

FIG. 34 is a right side elevational view of the pump housing shown in FIG. 30.

DETAILED DESCRIPTION OF THE PRESENTLY PREFERRED EMBODIMENTS

Figure 1:
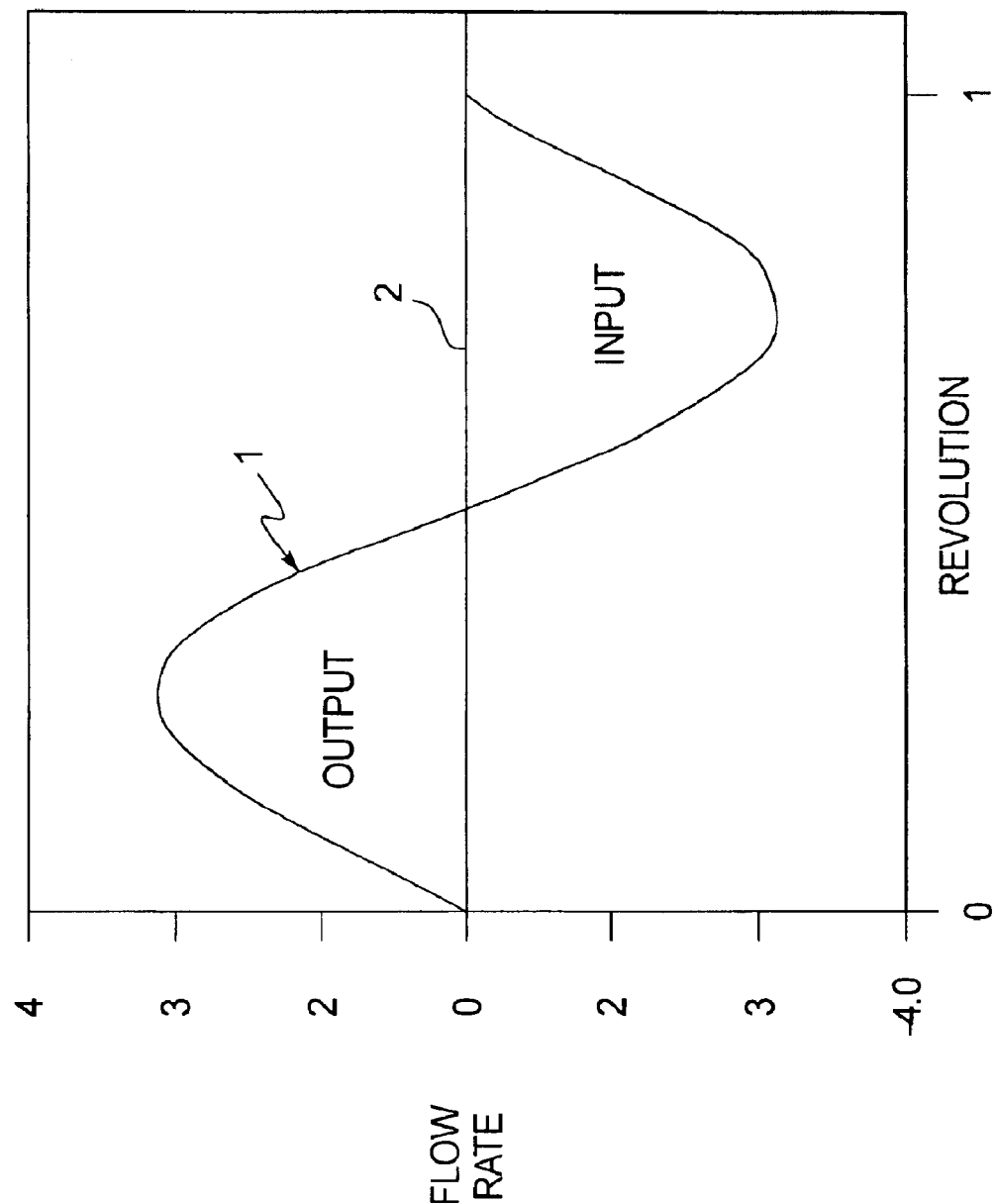
FIG. 1 illustrates graphically a typical sinusoidal dispense/intake profile for a conventional nutating pump operating at a constant motor speed.

A fluid dispense system 10 according to the disclosure is shown in FIG. 2. The fluid dispense system 10 dispenses a variety of paint colorant colorants from several colorant canisters 12 which hold bulk colorants. Of course the dispense system 10 is clearly applicable to fluid dispense systems other than paint colorant dispense systems. The fluid dispense system 10 has a computer control system 14 which stores the paint color formulas and operatively controls the fluid dispense system 10 to dispense the correct colorants and amounts of the colorants into a base paint. Once the proper colorants have been dispensed into the base paint, the coloranted paint is thoroughly mixed to produce a mixed paint of the desired color.

Referring to FIGS. 2 and 3, each colorant canister 12 is fluidly connected to an inlet to a fluid pump 16 by a tube 18. The embodiment shown in FIGS. 2 and 3 includes a nutating pump as the fluid pump 16; however, other fluid pumps are contemplated by this disclosure. An outlet from the fluid pump 16 is fluidly connected to an inlet 20 to a dispense nozzle 22 by a delivery tube 24. A stepper motor 26 is linked to and drives the fluid pump 16. Although a stepper motor is described, those skilled in the art will recognize that other control drives may be utilized. The stepper motor 26 is operatively/electrically connected to and controlled by the computer control system 14. The nutating pump 16 functions both as a fluid pump and as a valve, and thus, a separate valve is not required to dispense the colorants. In other words, the fluid dispense system 10 is a valveless system from the colorant canister 12 to the dispense nozzle 22.

An agitation motor 28 is connected to and drives an agitator 30 positioned inside of the colorant canister 12. The computer control system 14 operates the agitation motor 28 to drive the agitator 30 and maintain a consistent mix of the colorant colorant in the colorant canister 12.

The dispense nozzle 22 has a plurality of inlets 20 in which each dispense nozzle inlet 20 is provides for a separate colorant. The dispense nozzle 22 has an outlet 32 which points downward and is above a roller shelf 34. An open container of base paint is placed on the roller shelf 34 underneath the dispense nozzle outlet 32 for dispensing the colorant colorants into the base paint.

The nutating pump 16 is shown in greater detail in FIG. 4. A piston 34 axially reciprocates and rotates inside of a liner 36. The liner 36 is contained within a housing 38 by a nut 40 and a seal 42. The piston 34 has a pin 44 engaged with a spherical bearing 46 which is held by a rotatable sleeve 48. The sleeve 48 is mounted to and rotatably driven by a shaft of the stepper motor 26. The stepper motor 26 and these components are mounted to a bracket 50.

The sleeve 48 has a sensor projection 52 which allows for determination of the rotational position of the stepper motor 26 and the piston 34. As one alternative to the sensor projection 52, a sensor wheel 54 can be provided on the shaft 56 of the stepper motor 26. A home sensor 58 is positioned such that it can sense the position of the sensor wheel 54. For example, the home sensor 58 can be a photo-sensor which has a light beam that is interrupted by the sensor wheel 54 depending on the angular position of the sensor wheel 54. The home sensor 58 is electronically connected to the computer control system 14 of the fluid dispense system 10 by a wire 60. The sensor wheel 54 and the home sensor 58 combine to form a position sensor 62 which provides a signal to the computer control system 14 indicative of the rotational position of the stepper motor 26 and the piston 34 of the nutating pump 16. It will be understood by those in the art that many different types of position sensors may be employed for determining and controlling stepper motor position, for example, the sensor 58 could be a Hall effect sensor.

The embodiment of the position sensor 62 shown in FIG. 5 senses the angular position of the shaft 56 each time the leading edge 64 of the sensor wheel 54 rotates and breaks the light beam. The position of the leading edge 64 breaking the light beam (not shown) and tripping the home sensor 58 defines the "home position" of the nutating pump 16, i.e. the home position of the piston 34 in the liner 36. The home position of the nutating pump 16 is a defined axial and rotational position of the piston 34 in the liner 36. When the light beam is broken by the leading edge 64 of the sensor wheel 54, the home sensor 58 sends a signal indicative of the home position to the computer control system 14. The computer control system 14 receives and interprets the signal. In this manner the computer control system 14 determines when the nutating pump 16 is in the home position. The home position can be set at any desired position of the nutating pump 16; however, a convenient position may be top dead center or bottom dead center of the piston 34 in the liner 36.

The computer control system 14 can determine the position of the nutating pump 16 (axial and rotational positions of the piston 34) at any time, e.g. continuously tracks the nutating pump position. The position of the nutating pump 16 is determined by starting with the home position, which is a known position, and adding the amount of rotation imparted on the piston 34 by the stepper motor 26. As the stepper motor 26 rotates the sensor wheel 54, the next time the leading edge 64 trips the home sensor 58 the computer control system resets the computer stored position of the nutating pump 16 at the home position.

The home sensor 58 in the embodiment shown in FIG. 5 is a single position sensor, i.e. it only senses the home position. However, other position sensors could be utilized which can sense various positions of the shaft 56 or the nutating pump 16.

Stepper motors are well known and can be precisely controlled. Thus, the computer control system 14 can very accurately determine, track, and control the positions of the nutating pump 16. The nutating pump 16 is a highly accurate and consistent fluid pump. Accordingly, the computer control system 14, the stepper motor 26, and the nutating pump 16 accurately and consistently pump a precise amount of colorant from a given colorant canister 12.

A simplified operation of the nutating pump 16 will now be described assuming (1) that the home position is defined as the piston 34 being slid the furthest distance into the liner 36 (top dead center) and (2) the pump chamber inside the liner 36 is "empty" of colorant. Starting at the midpoint of the dispense/intake profiles shown in FIGS. 1 and 18–20 (see, e.g., step no. 200 in FIGS. 18–20) the computer control system 14 sends a signal to the stepper motor 26 to rotate 180° (bottom dead center 200 steps in the examples of FIGS. 18–20) which rotates the piston 34 180° to fill the pump chamber inside the liner 36 with colorant through a pump inlet 66. Colorant is then dispensed by the computer control system 14 sending another signal to the stepper motor 26 to rotate through a predetermined number of additional dispense steps (e.g. from 1 to 200 steps for the examples illustrated in FIGS. 18–20). The piston 34 rotates and slides into the liner 36 and colorant is pumped out of a pump outlet 68 and to the dispense nozzle 22.

The amount of colorant that is dispensed depends on the number of steps rotated by the stepper motor 26 and the corresponding movement of the piston 34 in the nutating pump 16. The nutating pump 16 has a non-linear output. The output of one revolution can be represented as left half of the sinusoidal pattern of FIGS. 18–20.

Figure 18:
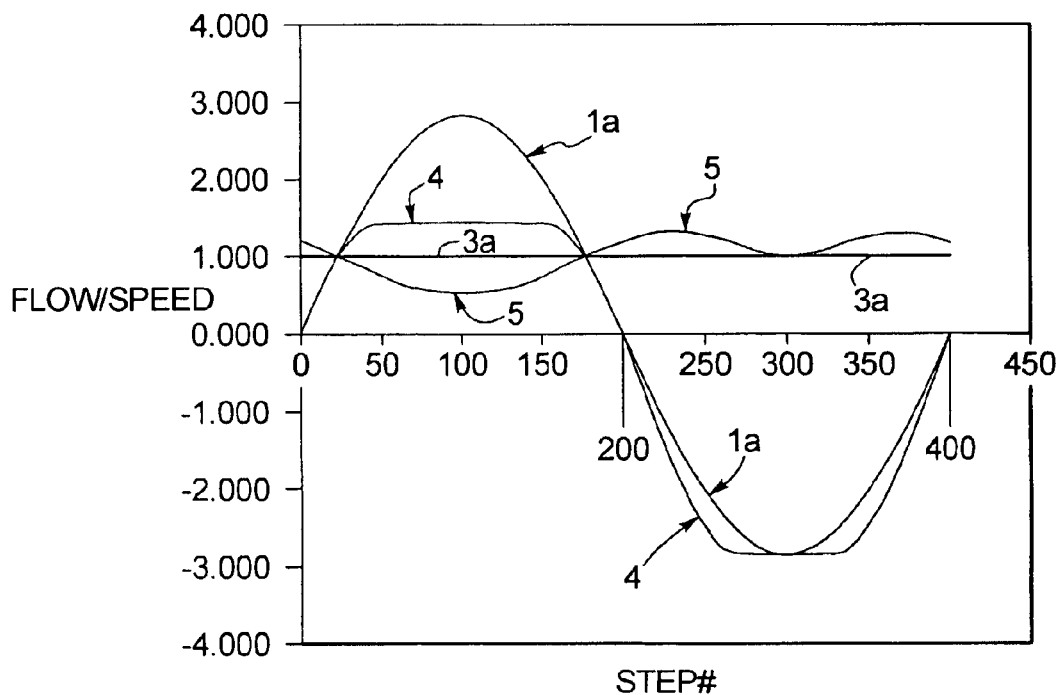
FIG. 18 illustrates, graphically a dispense/intake profile and motor speed in accordance with one disclosed embodiment and, for purposes of comparison, a conventional dispense/intake profile of a conventional nutating pump operating at a constant motor speed.
Figure 19:
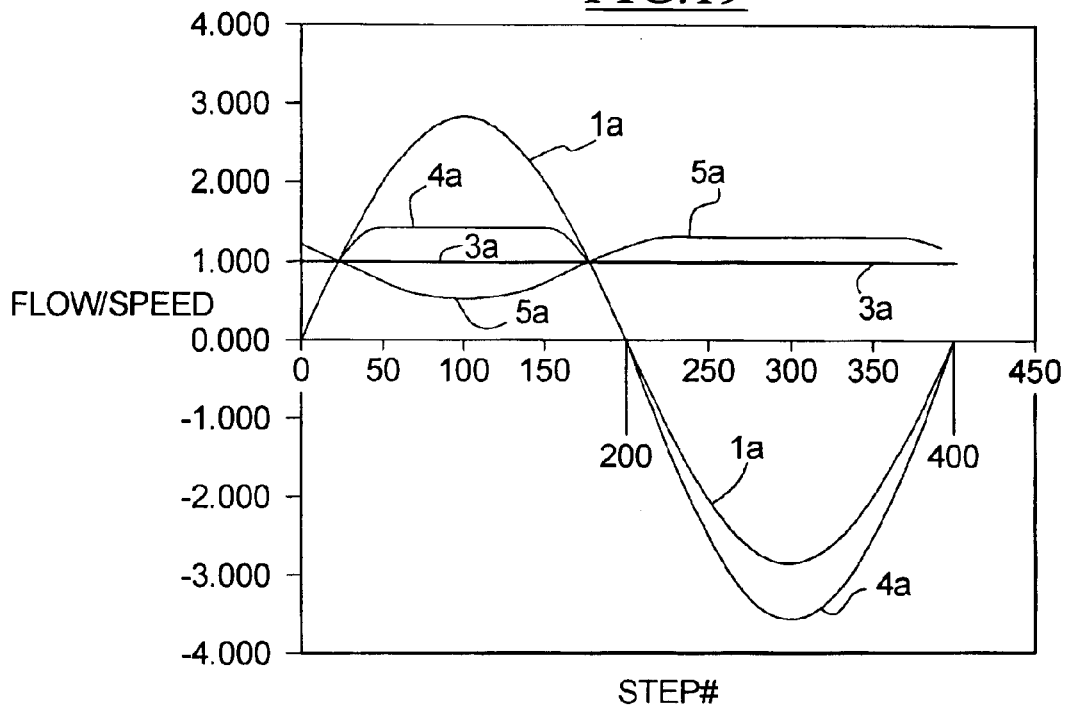
FIG. 19 illustrates, graphically a dispense/intake profile and motor speed in accordance with another disclosed embodiment and, for purposes of comparison, a conventional dispense/intake profile of a conventional nutating pump operating at a constant motor speed.
Figure 20:
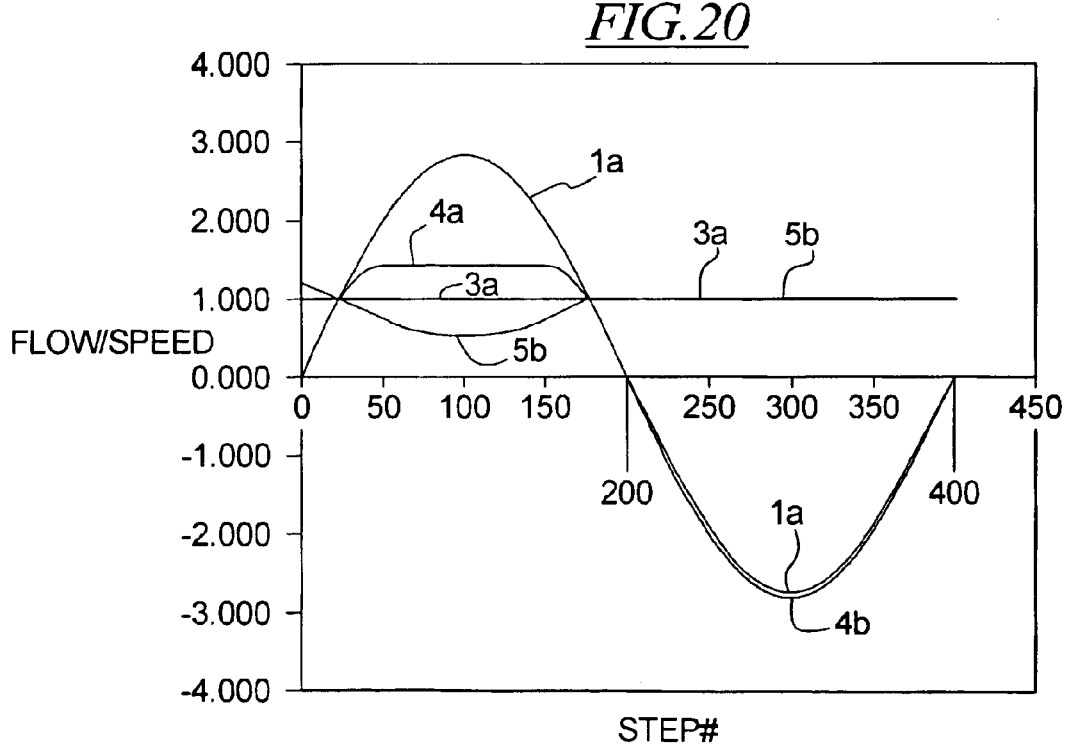
FIG. 20 illustrates, graphically a dispense/intake profile and motor speed in accordance with yet another disclosed embodiment and, for purposes of comparison, a conventional dispense/intake profile of a conventional nutating pump operating at a constant motor speed.

For example, the profiles of FIGS. 18–20 represent the dispense/intake profile of the nutating pump 16 versus angle of rotation of the associated stepper motor shaft 56 through 180° revolution of dispense and 180° revolution of intake. The area under the dispense portion of the curve is broken into 200 approximately equal segments in FIGS. 18–20 which represent unequal amounts of fluid dispense. By keeping track of angle rotation of the stepper motor 16 with the position sensor 62 and the computer control system 14, the rotation of the motor shaft 56 can be stopped at a point that will result in an accurate fraction (e.g., $\frac{1}{400}$th) of the full-rotation dispense of the attached nutating pump 16. The modification of motor speed during the dispense and intake will be discussed below.

In a preferred embodiment, the stepper motor 26 is used for the motor that drives the nutating pump 16. Stepper motors have their full rotation broken into a plurality of discrete segments, called steps. In preferred embodiments stepper motors 26 with 200 steps and 400 steps can be used. Additionally, electronic control devices can break the steps into smaller, partial steps by careful control of the motor windings (a process known as half stepping, or also micro stepping). In this way, within appropriate torque limits, the rotation of the stepper motor can be accurately determined without feedback by keeping track of how far the motor has been driven around its rotation.

In order to accurately synchronize the motor shaft 56 position to the dispense/intake profile (FIGS. 18–20) of the pump 16, the home sensor 58 (FIG. 5) can be used. The home sensor 58 sends a signal to the computer control system 14 when the stepper motor 26 has reached an arbitrary zero point (the home position). The computer control system 14 counts the number of steps or micro steps the stepper motor 26 rotates past the home position.

In operation of the fluid dispense system 10, an operator places a container of base paint under the dispense nozzle 22, and selects the desired paint color formula using the computer control system 14. The computer control system 14 uses the color formula to determine the number of dispense segments required according to the dispense profile graphs of FIGS. 18–20 and the angular position of the piston 34 at the commencement of the job.

The computer control system 14 sends a signal to the stepper motor 26 to begin stepping or micro stepping. The computer controls system 14 counts the number of steps or micro steps past the home position. As the stepper motor 26 rotates to the appropriate pre-identified angular position, the computer control system 14 determines that the volume of colorant corresponding to the dispense graph segments has been dispensed. One segment under the graph represents the minimum amount of colorant that can be dispensed. By accumulating the number of times the nutating pump 16 has dispensed the minimum (one segment, partial-rotation) dispense, the computer control system 14 can dispense various volumes of colorant which correspond to multiples of the minimum dispense. For example, one segment under the dispense portion of the profile can represent $\frac{1}{256}$th of an ounce, $\frac{3}{256}$th of an ounce, or $\frac{13}{256}$th of an ounce, etc. For larger dispenses, the speed of the stepper motor 26 can be increased or decreased for higher or lower dispense speeds. Also, the computer control system 14 can count full dispense revolutions of the nutating pump 16 for larger volume fluid dispenses.

Given any particular stepper motor speed, this partial-rotation of the nutating pump 16 method can dispense fluid accurately and quickly for any desired dispense volume. For example, for any given volume of fluid dispense, the fluid dispense system 10 using partial revolutions of the nutating pump 16 can dispense fluid significantly faster than a similar pump having a smaller volume dispense per revolution which must rotate multiple full revolutions.

To avoid any splashing of colorant which may occur during the peak dispense rates shown in the vicinity of the $100^{th}$ step of FIGS. 18–20, the stepper motor speed can be reduced thereby reducing the peak dispense flow rate and thereby avoiding any splashing phenomena. Splashing phenomena is very disadvantageous because colorant is highly concentrated and therefore if any colorant splashes out of the container of base paint, the resulting color of the paint will not be accurate. Further, splashing of colorant on the dispense system 10 must eventually be removed which is time consuming and therefore costly.

Therefore, three schemes for modifying the stepper motor speed during the rotation of the piston 34 are proposed. However, the reader will note that when modifications to the profiles illustrated in FIGS. 18–20 are possible and within the spirited scope of this disclosure. Turning to FIG. 18, the curve 1*a* illustrates the typical sinusoidal dispense/intake profile operating at a constant motor speed, represented by the line 3*a*. The modified profile 4 illustrates a departure from the sinusoidal profile 1*a* and is achieved by varying the motor speed in accordance with the line 5. Specifically, during the dispense portion of the profile 4, when the dispense rate would be the highest, the motor speed is reduced as shown by the curve 5 thereby reducing the peak dispense rate to a level that is about one-half of the normal peak dispense rate represented by the profile 1*a*. As a result, the peak dispense rate is reduced and splashing is less likely to occur.

Referring to the right side of the graphical illustration of FIG. 18, in order to make up for the "lost time" that results from reducing the motor speed during the dispense portion of the profile 4 (see the line 5 on the left side of FIG. 18), the motor speed is increased at the beginning and end of the intake portion of the profile 4, shown on the right side of FIG. 18. By increasing the motor speed at the beginning and end of the intake portion of the profile 4, the intake flow rates are increased at the beginning and end of the intake portion of the profile, but the peak intake flow rate is not increased because the motor speed is reduced during the middle portion of the intake as illustrated by the line 5 at about step 30 in FIG. 18.

Turning to FIG. 19, a more simplified modification of the motor speed is illustrated. Specifically, a profile 4*a* is generated whereby during the dispense portion of the profile 4*a*, the motor speed is reduced as illustrated by the motor speed line 5*a* which results in a flattening of the dispense portion of the profile 4*a* in a manner similar to that shown in FIG. 18. However, to make up for the lost time during the dispense portion of the profile 4*a*, the motor speed in increased during the intake portion of the profile 4*a* (see the portion of the line 5*a* to the right side of FIG. 19), which results in an increase in the intake flow rate and, consequently, the peak intake flow rate as illustrated by the portion of the profile for a shown on the right side of FIG. 19.

In contrast, as shown in FIG. 20, the motor speed is reduced during the dispense portion of the profile 4*b* as illustrated by the portion of the motor speed curve 5*b* shown at the left of FIG. 20, but the motor speed is maintained at a constant rate as shown by the flat portion of the curve 5*a* on the right side of FIG. 20 as it overlaps the constant motor speed line 3*a*, which results in a intake profile 4*b* at the right of FIG. 20 which substantially overlaps the constant motor speed profile 1*a*. In all three disclosed embodiments illustrated in FIGS. 18–20, the peak dispense rates are reduced thereby reducing the likelihood of any splashing occurring.

The dispense/intake profiles 4, 4*a*, 4*b* can be stored as algorithms, curves or lookup tables in the computer control system 14. After the operator selects the paint colorant formula, the computer control system 14 determines the dispense quantity for each colorant. A signal is sent from the computer control system 14 to the stepper motor 16 to initiate a particular colorant dispense quantity. The per step volume is added to an accumulator in the computer control system 14 as the stepper motor 16 rotates at the predetermined speed or speeds. The computer control system 14 rotates the stepper motor 16 at the predetermined speed or speeds until the accumulator equals or slightly exceeds the desired dispense volume. In this way, any quantity of fluid can be dispensed based upon the lookup table, curve or algorithm to at least the accuracy of the smallest step size.

Also, since many pumps have slip which changes with pump speed, the computer control system 14 can multiply the per step volume by a speed-based correction factor before the per step volume is added to the accumulator. Thus, the fluid dispense system 10 can compensate for pump slip which may occur when the stepper motor speed is varied.

Look-up tables corresponding to FIGS. 18–20 are provided as Tables I–III respectively. Only one out of every 10 steps are illustrated for a 400 step profile for purposes of brevity.

TABLE I

Pulse Reduction With Increased Speed During Fill, Without Increasing Peak Fill Rate (See FIG. 18).
accel: rev/sec/sec

| Step # | RPM | Acceleration | Flowrate | Norm-Spd | Std Flow |
|---|---|---|---|---|---|
| 0 | 1185 | −757 | 0.000 | 1.185 | 0.000 |
| 10 | 1105 | −988 | 0.477 | 1.105 | 0.442 |
| 20 | 1024 | −916 | 0.874 | 1.024 | 0.874 |
| 30 | 930 | −971 | 1.167 | 0.930 | 1.284 |
| 40 | 836 | −873 | 1.358 | 0.836 | 1.663 |
| 50 | 724 | −901 | 1.414 | 0.724 | 2.000 |
| 60 | 633 | −640 | 1.415 | 0.633 | 2.288 |
| 70 | 574 | −376 | 1.413 | 0.574 | 2.520 |
| 80 | 538 | −215 | 1.414 | 0.538 | 2.690 |
| 90 | 518 | −115 | 1.414 | 0.518 | 2.794 |
| 100 | 512 | −34 | 1.415 | 0.512 | 2.828 |
| 110 | 518 | 35 | 1.414 | 0.518 | 2.794 |
| 120 | 538 | 120 | 1.414 | 0.538 | 2.690 |
| 130 | 574 | 230 | 1.413 | 0.574 | 2.520 |
| 140 | 633 | 415 | 1.415 | 0.633 | 2.288 |
| 150 | 724 | 732 | 1.414 | 0.724 | 2.000 |
| 160 | 836 | 1040 | 1.358 | 0.836 | 1.663 |
| 170 | 931 | 977 | 1.167 | 0.931 | 1.284 |
| 180 | 1025 | 1076 | 0.875 | 1.025 | 0.874 |
| 190 | 1105 | 982 | 0.478 | 1.105 | 0.442 |
| 200 | 1185 | 1053 | 0.000 | 1.185 | 0.000 |
| 210 | 1243 | 794 | −0.537 | 1.243 | −0.442 |
| 220 | 1300 | 831 | −1.110 | 1.300 | −0.874 |
| 230 | 1300 | 0 | −1.631 | 1.300 | −1.284 |
| 240 | 1300 | 0 | −2.111 | 1.300 | −1.663 |
| 250 | 1261 | −553 | −2.463 | 1.261 | −2.000 |
| 260 | 1221 | −536 | −2.729 | 1.221 | −2.288 |
| 270 | 1144 | −979 | −2.816 | 1.144 | −2.520 |
| 280 | 1072 | −858 | −2.817 | 1.072 | −2.690 |
| 290 | 1032 | −459 | −2.816 | 1.032 | −2.794 |
| 300 | 1020 | −136 | −2.818 | 1.020 | −2.828 |
| 310 | 1032 | 138 | −2.816 | 1.032 | −2.794 |
| 320 | 1072 | 476 | −2.817 | 1.072 | −2.690 |
| 330 | 1144 | 915 | −2.816 | 1.144 | −2.520 |
| 340 | 1221 | 1045 | −2.729 | 1.221 | −2.288 |
| 350 | 1261 | 553 | −2.463 | 1.261 | −2.000 |
| 360 | 1300 | 571 | −2.111 | 1.300 | −1.663 |
| 370 | 1300 | 0 | −1.631 | 1.300 | −1.284 |
| 380 | 1300 | 0 | −1.110 | 1.300 | −0.874 |
| 390 | 1243 | −794 | −0.537 | 1.243 | −0.442 |
| 400 | 1185 | −757 | 0.000 | 1.185 | 0.000 |

TABLE II

Pulse Reduction With Increased Speed During Fill, Allowing Increased Peak Fill Rate (See FIG. 19).
accel: rev/sec/sec

| Step # | RPM | Acceleration | Flowrate | Norm-Spd | Std Flow |
|---|---|---|---|---|---|
| 0 | 1185 | −757 | 0.000 | 1.157 | 0.000 |
| 10 | 1105 | −988 | 0.477 | 1.079 | 0.442 |
| 20 | 1024 | −916 | 0.874 | 1.000 | 0.874 |
| 30 | 930 | −971 | 1.167 | 0.908 | 1.284 |
| 40 | 836 | −873 | 1.358 | 0.816 | 1.663 |
| 50 | 724 | −901 | 1.414 | 0.707 | 2.000 |
| 60 | 633 | −640 | 1.415 | 0.618 | 2.288 |
| 70 | 574 | −376 | 1.413 | 0.561 | 2.520 |
| 80 | 538 | −215 | 1.414 | 0.525 | 2.690 |
| 90 | 518 | −115 | 1.414 | 0.506 | 2.794 |
| 100 | 512 | −34 | 1.415 | 0.500 | 2.828 |
| 110 | 518 | 35 | 1.414 | 0.506 | 2.794 |
| 120 | 538 | 120 | 1.414 | 0.525 | 2.690 |
| 130 | 574 | 230 | 1.413 | 0.561 | 2.520 |
| 140 | 633 | 415 | 1.415 | 0.618 | 2.288 |
| 150 | 724 | 732 | 1.414 | 0.707 | 2.000 |
| 160 | 836 | 1040 | 1.358 | 0.816 | 1.663 |
| 170 | 931 | 977 | 1.167 | 0.909 | 1.284 |
| 180 | 1025 | 1076 | 0.875 | 1.001 | 0.874 |
| 190 | 1105 | 982 | 0.478 | 1.079 | 0.442 |
| 200 | 1185 | 1053 | 0.000 | 1.157 | 0.000 |
| 210 | 1243 | 794 | −0.537 | 1.213 | −0.442 |
| 220 | 1300 | 831 | −1.110 | 1.270 | −0.874 |
| 230 | 1300 | 0 | −1.631 | 1.270 | −1.284 |
| 240 | 1300 | 0 | −2.111 | 1.270 | −1.663 |
| 250 | 1300 | 0 | −2.540 | 1.270 | −2.000 |
| 260 | 1300 | 0 | −2.906 | 1.270 | −2.288 |
| 270 | 1300 | 0 | −3.200 | 1.270 | −2.520 |
| 280 | 1300 | 0 | −3.416 | 1.270 | −2.690 |
| 290 | 1300 | 0 | −3.548 | 1.270 | −2.794 |
| 300 | 1300 | 0 | −3.592 | 1.270 | −2.828 |
| 310 | 1300 | 0 | −3.548 | 1.270 | −2.794 |
| 320 | 1300 | 0 | −3.416 | 1.270 | −2.690 |
| 330 | 1300 | 0 | −3.200 | 1.270 | −2.520 |
| 340 | 1300 | 0 | −2.906 | 1.270 | −2.288 |
| 350 | 1300 | 0 | −2.540 | 1.270 | −2.000 |
| 360 | 1300 | 0 | −2.111 | 1.270 | −1.663 |
| 370 | 1300 | 0 | −1.631 | 1.270 | −1.284 |
| 380 | 1300 | 0 | −1.110 | 1.270 | −0.874 |
| 390 | 1243 | −794 | −0.537 | 1.213 | −0.442 |
| 400 | 1185 | −757 | 0.000 | 1.157 | 0.000 |

TABLE III

Pulse Reduction With No Increased Speed During Fill, 1000 RPM Max Speed (See FIG. 20).
accel: rev/sec/sec

| Step # | RPM | Acceleration | Flowrate | Norm-Spd | Std Flow |
|---|---|---|---|---|---|
| 0 | 1000 | 0 | 0.000 | 1.000 | 0.000 |
| 10 | 1000 | 0 | 0.432 | 1.000 | 0.442 |
| 20 | 1000 | 0 | 0.854 | 1.000 | 0.874 |
| 30 | 918 | −836 | 1.151 | 0.918 | 1.284 |
| 40 | 836 | −762 | 1.358 | 0.836 | 1.663 |
| 50 | 724 | −901 | 1.414 | 0.724 | 2.000 |
| 60 | 633 | −640 | 1.415 | 0.633 | 2.288 |
| 70 | 574 | −376 | 1.413 | 0.574 | 2.520 |
| 80 | 538 | −215 | 1.414 | 0.538 | 2.690 |
| 90 | 518 | −115 | 1.414 | 0.518 | 2.794 |
| 100 | 512 | −34 | 1.415 | 0.512 | 2.828 |
| 110 | 518 | 35 | 1.414 | 0.518 | 2.794 |
| 120 | 538 | 120 | 1.414 | 0.538 | 2.690 |
| 130 | 574 | 230 | 1.413 | 0.574 | 2.520 |
| 140 | 633 | 415 | 1.415 | 0.633 | 2.288 |
| 150 | 724 | 732 | 1.414 | 0.724 | 2.000 |
| 160 | 836 | 1040 | 1.358 | 0.836 | 1.663 |
| 170 | 918 | 836 | 1.151 | 0.918 | 1.284 |
| 180 | 1000 | 911 | 0.854 | 1.000 | 0.874 |
| 190 | 1000 | 0 | 0.432 | 1.000 | 0.442 |
| 200 | 1000 | 0 | 0.000 | 1.000 | 0.000 |
| 210 | 1000 | 0 | −0.432 | 1.000 | −0.442 |
| 220 | 1000 | 0 | −0.854 | 1.000 | −0.874 |
| 230 | 1000 | 0 | −1.254 | 1.000 | −1.284 |
| 240 | 1000 | 0 | −1.624 | 1.000 | −1.663 |
| 250 | 1000 | 0 | −1.954 | 1.000 | −2.000 |
| 260 | 1000 | 0 | −2.235 | 1.000 | −2.288 |
| 270 | 1000 | 0 | −2.462 | 1.000 | −2.520 |
| 280 | 1000 | 0 | −2.628 | 1.000 | −2.690 |
| 290 | 1000 | 0 | −2.729 | 1.000 | −2.794 |
| 300 | 1000 | 0 | −2.763 | 1.000 | −2.828 |
| 310 | 1000 | 0 | −2.729 | 1.000 | −2.794 |
| 320 | 1000 | 0 | −2.628 | 1.000 | −2.690 |
| 330 | 1000 | 0 | −2.462 | 1.000 | −2.520 |
| 340 | 1000 | 0 | −2.235 | 1.000 | −2.288 |
| 350 | 1000 | 0 | −1.954 | 1.000 | −2.000 |
| 360 | 1000 | 0 | −1.624 | 1.000 | −1.663 |
| 370 | 1000 | 0 | −1.254 | 1.000 | −1.284 |
| 380 | 1000 | 0 | −0.854 | 1.000 | −0.874 |
| 390 | 1000 | 0 | −0.432 | 1.000 | −0.442 |
| 400 | 1000 | 0 | 0.000 | 1.000 | 0.000 |

Figure 21:
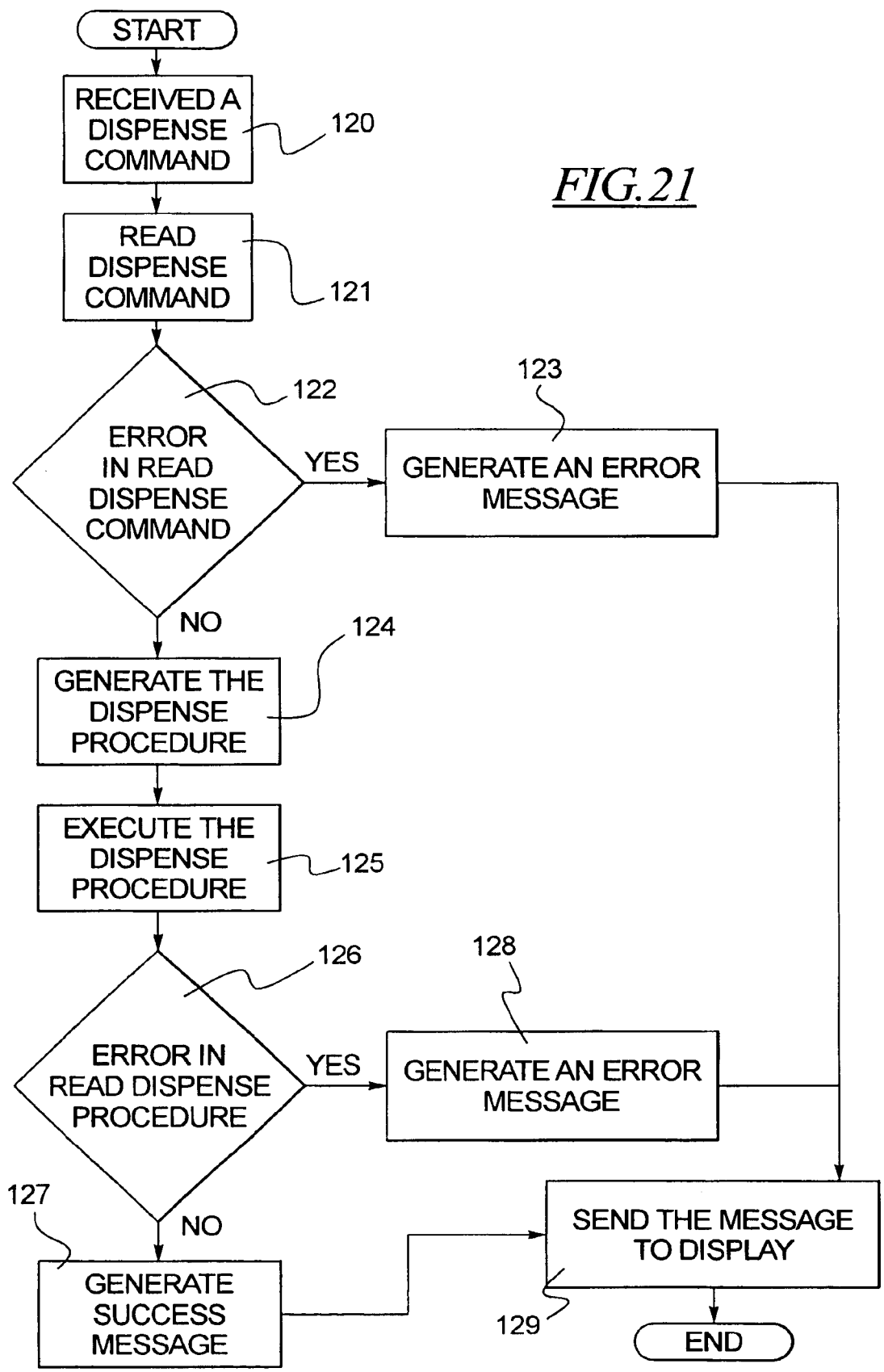
FIG. 21 is a flow chart illustrating a control system for carrying out the dispense/intake profiles illustrated in FIGS. 18–20, or variations thereof.
Figure 22:
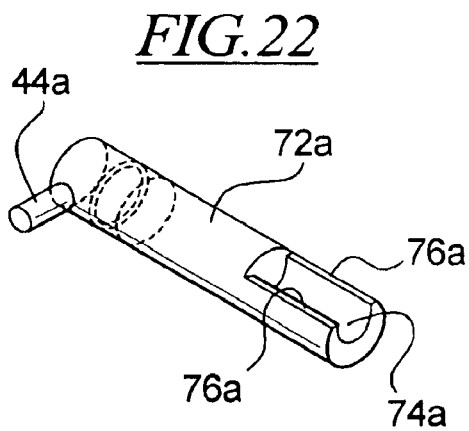
FIG. 22 is a perspective view of an alternative embodiment of a piston of a nutating pump in accordance with another embodiment.
Figure 23:
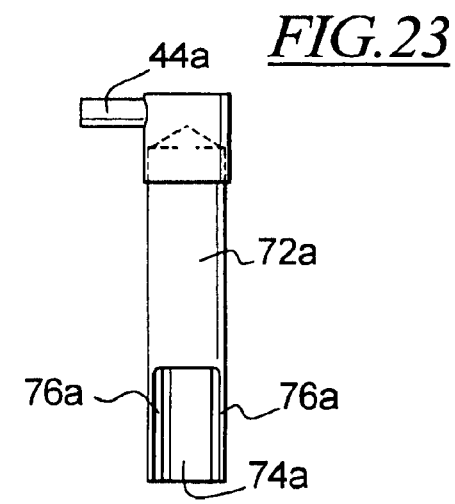
FIG. 23 is a top elevational view of the piston of FIG. 22.
Figure 24:
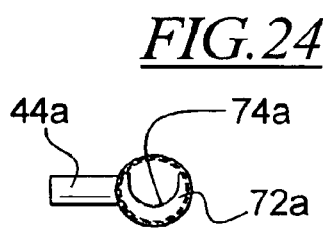
FIG. 24 is an end view of the piston of FIG. 22.
Figure 25:
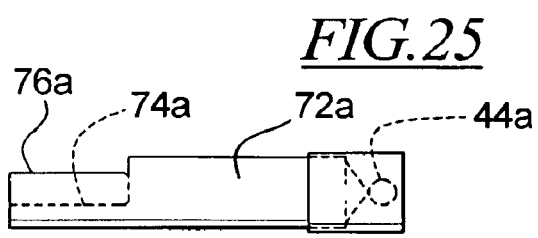
FIG. 25 is a side elevational view of the piston of FIG. 22.

FIG. 21 is a flow chart illustrating one methodology that can be carried out by the control system 14 (see also FIG. 1). A dispense command is inputted at step 120 by way of a key board or control panel 14a to the controller 14b. The controller 14 reads the dispenser command at step 121 and determines if an error is contained in the command at step 122. If the input command has an error, an error message is generated at 123 and sent to the monitor 14c (see step 129). If no error is detected in the dispense command, a dispense procedure is generated at 124 using one of the methodologies discussed above and the number of steps required is calculated. The dispense procedure is carried out at 125 and, often an additional error check at, a success message is generated at 127 and sent to the moitor 14c at 129. If an error is detected in the dispense procedure at 126, an error message is generated at 128.

Referring back to FIG. 4, the piston 34 has a flat notched portion 70 which is typical for nutating pumps. Another embodiment of a cylindrical piston 72 is shown in FIGS. 6–9. At the flat notched portion 70, the piston 72 has a recessed portion 74 extending into the piston 72 from outer edges 76. The recessed portion 74 provides the nutating pump with a larger pocket for fluid to pass through than the flat portion 70 as the piston 72 moves axially back and forth. Thus, the piston 72 provides less fluid flow restriction. Because the outer edges 76 are at the same relative position as the flat portion 70 in the piston 34 (FIG. 4), the recessed portion 74 does not affect the open/close operation of the nutating pump 16 as the piston 72 rotates. The depth and shape of the recessed portion 74 can be varied as desired.

Yet another embodiment of a cylindrical piston 72a is illustrated in FIGS. 22–25. The piston 72a includes a more profound recessed portion of 74a with an even larger pocket for fluid transport. Again, because of the larger recessed portion 74a, axial movement of the piston 72a encounters less fluid flow restriction. Further, because the outer edges 76a are in the same relative position as the flat portion 70 of the piston 34 as shown in FIG. 4, the larger recessed portion 74a does not effect the open/close operation of the pump 16 as the piston 72a rotates.

Figure 10:
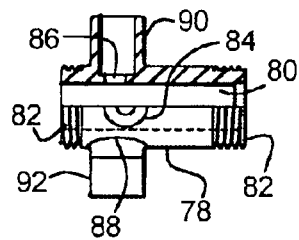
FIG. 10 is a front elevational, partial cross-sectional view of a piston housing.
Figure 11:
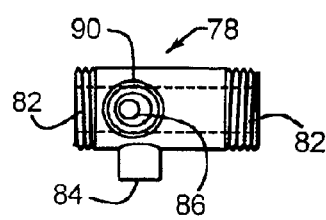
FIG. 11 is a top plan view of the piston housing of FIG. 10.
Figure 12:
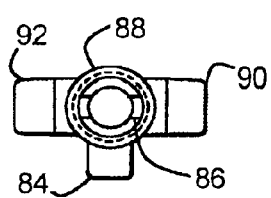
FIG. 12 is a left side view of the piston housing of FIG. 10.

Another nutating pump housing 78 is shown in FIGS. 10–12. The housing 78 has a piston bore 80 for receiving the piston 34 (FIG. 3). The diameter of the piston bore 80 has a size such that an additional liner 36 is not needed. Caps (not shown) are mounted on the threaded ends 82 of the housing 78 to seal the piston 34 inside of the housing 78. A mounting portion 84 allows the housing 78 to be securely mounted to a support. Round inlet and outlet openings 86, 88 are provided to allow fluid to enter into and be pumped out of the housing 78. Inlet and outlet ports 90, 92 are fluidly connected to the inlet and outlet openings 86, 88, respectively. The inside diameters of the inlet and outlet ports 90, 92 are greater than the diameters of the inlet and outlet openings 86, 88 to reduce fluid flow restriction and allow for increased fluid flow.

Figure 13:
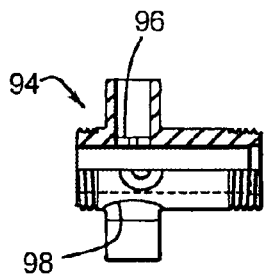
FIG. 13 is a front elevational, partial cross-sectional view of another disclosed piston housing.
Figure 14:
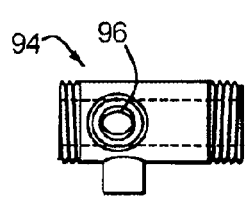
FIG. 14 is a top plan view of the piston housing of FIG. 13.
Figure 15:
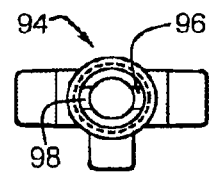
FIG. 15 is a left side view of the piston housing of FIG. 13.

Another nutating pump housing 94 is shown in FIGS. 13–15. The housing 94 has oval shaped inlet and outlet openings 96, 98. The oval shaped inlet and outlet openings 96, 98 provide larger openings for fluid flow which reduces flow restriction and increases fluid flow. The oval shaped openings 96, 98 are elongated in the longitudinal direction of the housing 94. The longitudinal elongation of the openings 96, 98 does not affect the opening and closing of the inlet and outlet openings 96, 98 as the piston 34 rotates and slides within the housing 94. Although oval shaped openings are shown other shapes of the openings can be utilized according to the invention.

Figure 26:
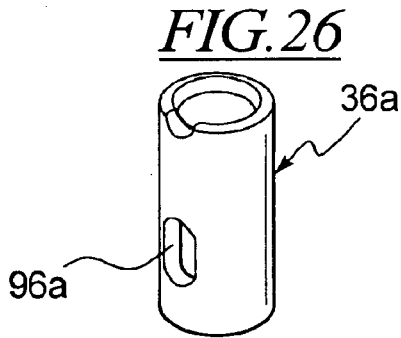
FIG. 26 is a perspective view of an alternative embodiment of a piston liner.
Figure 27:
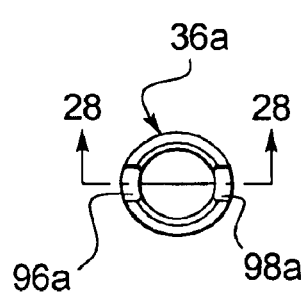
FIG. 27 is a top or end view of the piston liner shown in FIG. 26.
Figure 28:
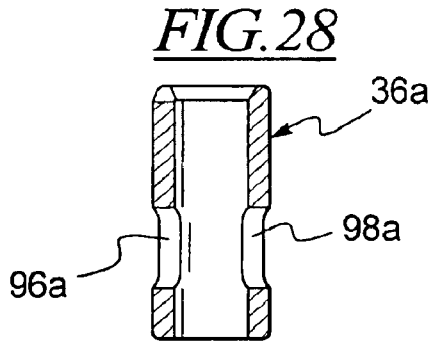
FIG. 28 is a sectional view taken substantially along line 28—28 of FIG. 27.
Figure 29:
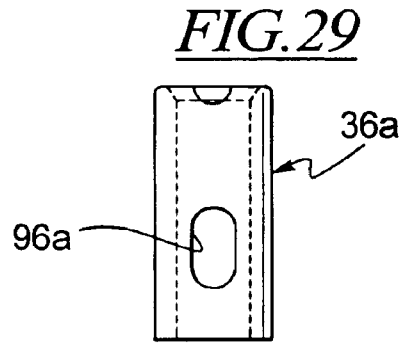
FIG. 29 is a front elevational view of the piston liner FIG. 26.

As a further alternative, a modified piston liner 36a is illustrated in FIGS. 26–28. The liner 36a includes elongated oval-shaped opening 96a, 98a for those embodiments that utilize a liner in addition to a pump housing.

Another nutating pump housing 94a as illustrated in FIGS. 30–34. The housing 34a has an enlarged inlet 90a which would be useful for the dispensed/intake profiles with increased intake flow rates such as those shown in FIGS. 18 and 19 and variations thereof. The inlet port 90a includes an oval shaped opening 96a as shown in FIG. 34 and the outlet port 92a also includes a oval shaped opening 98a is shown in FIG. 32.

FIGS. 16 and 17 illustrate two nutating pump adjustment mechanisms. Referring to FIG. 16, the first adjustment mechanism adjusts the angle between the shaft 56 of the stepper motor 26 and the longitudinal axis of the piston 34 and the housing 78. Adjusting the angle piston/stepper motor angle affects the output of the nutating pump. An angle adjuster bracket 100 is attached to the stepper motor 26 and has a hinged portion 102 mounted to the piston housing 78. An actuator 104 is mounted to the angle adjuster bracket 100 and is operatively engaged with the hinged portion 102 to pivot the housing 78 and piston 34 assembly, as desired. The spherical bearing 46, which is engaged with the piston 34 by the pin 44, allows the piston 34 to pivot relative to a piston driver 106, which is engaged with and rotated by the stepper motor shaft 56. The actuator is electrically connected to and controlled by the computer control system 14. Accordingly, the angle between the piston 34 and the motor shaft 56 is automatically controlled and manual adjustment of the angle is not required. Also, the output profile of the nutating pump is automatically controlled by the computer control system 14. Suitable actuators include solenoids, cams, stepper motors, linear actuators, and other actuators.

Referring to FIGS. 16 and 17, the second mutating pump adjustment mechanism adjusts the radial distance that the spherical bearing 46 is offset from the axis of the stepper motor shaft 56. By adjusting the spherical bearing/shaft offset the axial movement of the piston 34 sliding into and out of the housing 78 is increased or decreased, which affects the nutating pump output. In this manner, the output of the nutating pump 16 can be adjusted as desired.

The piston driver 106 has a stationary member 108 fixed to the stepper motor shaft 56. An adjustable member 110 has a bore 112 which receives the stationary member 108 such that the adjustable member 110 slides relative to the stationary member 108. A lock screw 114 extends through an adjustment slot 116 and is engaged with the stationary member 108. The lock screw 114 is loosened to allow sliding of the adjustable member 110 relative to the stationary member 108, and then tightened to secure the stationary and adjustable members 180, 110 together. The adjustable member 110 carries the spherical bearing 46. As the adjustable member 110 slides, the offset distance of the spherical bearing 46 relative to the stepper motor shaft 56 is adjusted as desired. By using a reversible drive it is also possible to provide a slight draw-back at the end of any dispense. Due to the viscosity of the fluids being dispensed, a greater of lesser amount of fluid may remain at the dispense outlet opening in the form of a partial drop. This can allow a post dispense fluid drip to occur.

By partially reversing the drive after a dispense, the fluid forming at the dispense outlet opening can be drawn back. Due to the very small increments of piston movement available utilizing the drive system described in this invention, it is possible to provide draw-back with a fine degree of control. For example, only a single step ($\frac{1}{400}^{th}$ of a full rotation) may be sufficient for small dispense orifices.

Where desired, the draw-back reverse rotation can be retained in control or memory and provide an automatic adjustment for the next dispense operation. Such memory retention would be advantageous where a larger draw-back has been provided. For example, if a multi-step draw-back is used to assure no drip at the dispense orifice, this would indicate that the fluid remaining in the conduit from the pump to the dispense orifice is less than the volume of the tube after draw-back. This quantity can then be automatically added to the next dispense calculation.

While the presently preferred embodiments have been illustrated and described, numerous changes and modifications can be made without significantly departing from the spirit and scope of this invention. Specifically, the control methods illustrated herein apply to pumps other than nutating pumps. Therefore, the inventors intend that such changes and modifications are covered by the appended claims.

What is claimed is:

1. A method of controlling a pump, the pump having a piston coupled to a motor, the method comprising:
   generating a dispense/intake profile for operation of the pump at varying motor speeds, the dispense/intake profile having a dispense portion and an intake portion, the profile being characterized as a plurality of value sets, each value set including angular position of the piston, flow rate and motor speed, the dispense portion of the profile having a peak dispense flow rate and the intake portion of the profile having a peak intake flow rate, the peak intake flow rate having an absolute value that is greater than the peak dispense flow rate as a result of a reduction in motor speed during the dispense portion of the profile as compared to the motor speed during the intake portion of the profile,
   dividing the profile into a plurality of steps wherein each step represents a transition from one value set to a succeeding value set so that each step represents one of a dispense amount that is less than an entire dispense amount of the dispense portion of the profile or an intake amount that is less than an entire intake amount of the intake portion of the profile,
   determining a number of steps required to dispense a desired amount of fluid; and
   operating the pump through the determined number of steps.

2. The method of claim 1 further comprising determining a number of steps of a stepper motor engaged with the nutating pump that corresponds to each of the steps.

3. The method claim 1 further comprising reversing the operation of the pump for at least one step to draw fluid back from the orifice towards the pump after the operating of the pump to prevent dripping.

4. The method of claim 1 wherein the flow rate is zero or a positive value for the dispense portion of the profile and the flow rate is zero or a negative value for the intake portion of the profile.

5. The method of claim 1 wherein the peak dispense flow rate is about one-half of the peak intake flow rate.

6. The method of claim 1 wherein the peak intake dispense flow rate is less than one-half of the peak intake flow rate.

7. The method of claim 1 wherein the dispense portion of the profile has an average intake motor speed and the intake portion of the profile has an average intake motor speed, the average intake motor speed is greater than the average dispense motor speed.

8. The method of claim 1 wherein the number of steps is greater than 100.

9. The method of claim 1 wherein the number of steps is greater than 200.

10. The method of claim 1 wherein the number of steps is greater than 300.

11. The method of claim 1 wherein the number of steps is about 400.

12. The method of claim 1 further comprising storing the profile in the memory of a controller in a form selected from the group consisting of a look-up table, an algorithm and a graph.

13. A method of controlling a pump, the pump having a piston coupled to a motor, the method comprising:

generating a first dispense/intake profile for operation of the pump at a first constant motor speed, the first dispense/intake profile having a dispense portion and an intake portion, the first profile being characterized as a plurality of pairs of values including angular position of the piston and flow rate for operation of the pump at the first constant motor speed, the dispense portion of the first profile having a first peak dispense flow rate, the intake portion of the profile having a first peak intake flow rate, generating a modified dispense/intake profile for operation of the pump at varying motor speeds, the modified profile having a dispense portion and an intake portion, the modified profile being characterized as a plurality of value sets including angular position of the piston, flow rate and motor speed, the dispense portion of the modified profile having a reduced peak dispense flow rate that is less than the first peak dispense flow rate of the first profile and a reduced motor speed that is less than the first constant motor speed, dividing the modified dispense/intake profile into a plurality of steps wherein each step represents a transition from value set to a succeeding value set so that each step represents a dispense amount, determining a number of steps of the modified profile required to dispense a desired amount of fluid, and operating the pump through the determined number of steps of the modified profile.

14. The method of claim 13 further comprising determining a number of steps of a stepper motor engaged with the nutating pump that corresponds to each of the steps.

15. The method claim 13 further comprising reversing the operation of the pump for at least one step to draw fluid back from the orifice towards the pump after the operating of the pump to prevent dripping.

16. The method of claim 13 wherein the flow rate is zero or a positive value for the dispense portion of the first and modified profiles and the flow rate is zero or a negative value for the intake portion of the first and modified profiles.

17. The method of claim 13 wherein the peak dispense flow rate is about one-half of the peak intake flow rate.

18. The method of claim 13 wherein the peak dispense flow rate is less than one-half of the peak intake flow rate.

19. The method of claim 13 wherein the dispense portion of the profile has an average intake motor speed and the intake portion of the profile has an average intake motor speed, the average intake motor speed is greater than the average dispense motor speed.

20. The method of claim 13 wherein the peak dispense motor speed is less than the first constant motor speed.

21. The method of claim 13 wherein the peak intake motor speed is greater than the first constant motor speed.

22. The method of claim 13 wherein the number of steps is greater than 100.

23. The method of claim 13 wherein the number of steps is greater than 200.

24. The method of claim 13 wherein the number of steps is greater than 300.

25. The method of claim 13 wherein the number of steps is about 400.

26. A method of reducing output flow of a nutating pump to avoid splashing of dispensed fluid, the pump including a piston coupled to a motor, the motor rotating the piston 360° wherein 180° of the rotation results in fluid intake into the pump and 180° of the rotation results in fluid being dispensed out of the pump, the method comprising: operating the motor at a variable speed by reducing the motor speed during the fluid dispense and increasing the motor speed during the fluid intake.

27. The method of claim 26 the motor speed during the fluid dispense is about one-half of the motor speed during the fluid intake.

28. The method of claim 26 the motor speed during the fluid dispense is less than one-half of the motor speed during the fluid intake.

29. A control system for a pump, the pump having a piston coupled to a motor, the method comprising:

a controller linked to the motor, the controller comprising a memory, the memory comprising a dispense/intake profile for operation of the pump at varying motor speeds, the dispense/intake profile having a dispense portion and an intake portion, the profile being characterized as a plurality of value sets, each value set including angular position of the piston, flow rate and motor speed, the dispense portion of the profile having a peak dispense flow rate and the intake portion of the profile having a peak intake flow rate, the peak intake flow rate having an absolute value that is greater than the peak dispense flow rate as a result of a reduction in motor speed during the dispense portion of the profile as compared to the motor speed during the intake portion of the profile, the controller being programmed to divide the profile into a plurality of steps wherein each step represents a transition from one value set to a succeeding value set so that each step represents one of a dispense amount that is less than an entire dispense amount of the dispense portion of the profile or an intake amount that is less than an entire intake amount of the intake portion of the profile, the controller being programmed to determine a number of steps required to dispense a desired amount of fluid, and the controller sending signals to the motor to rotate the piston through the determined number of steps.

* * * * *

UNITED STATES PATENT AND TRADEMARK OFFICE
CERTIFICATE OF CORRECTION

PATENT NO.    : 6,749,402 B2
DATED         : June 15, 2004
INVENTOR(S)   : Tim Hogan et al.

It is certified that error appears in the above-identified patent and that said Letters Patent is hereby corrected as shown below:

Title page,
Item [75], Inventors, please delete "Rock Island" and replace with -- Round Lake Beach --.

Signed and Sealed this

Twenty-eighth Day of September, 2004

JON W. DUDAS
*Director of the United States Patent and Trademark Office*